US006382459B1

(12) United States Patent
Liu

(10) Patent No.: US 6,382,459 B1
(45) Date of Patent: May 7, 2002

(54) HANDLE ACCESSORY FOR INFANT FEEDING BOWL

(75) Inventor: Anita Suk Ping Liu, Orlando, FL (US)

(73) Assignee: Dart Industries Inc., Orlando, FL (US)

( * ) Notice: Subject to any disclaimer, the term of this patent is extended or adjusted under 35 U.S.C. 154(b) by 0 days.

(21) Appl. No.: 09/208,885

(22) Filed: Dec. 10, 1998

(51) Int. Cl.[7] ............................................... B65D 23/10
(52) U.S. Cl. ..................................... 220/769; 220/719
(58) Field of Search .................................. 220/769, 719

(56) References Cited

U.S. PATENT DOCUMENTS

| 2,262,273 | A | * | 11/1941 | Ferrara ........................ 220/769 |
| 2,606,689 | A | * | 8/1952 | Kistner ........................ 220/698 |
| 2,665,936 | A | * | 1/1954 | Moore ......................... 220/769 |
| 3,101,857 | A | * | 8/1963 | Freedman .................... 220/769 |
| 5,203,471 | A | * | 4/1993 | Widman ...................... 220/769 |
| 5,377,863 | A | * | 1/1995 | Widman ...................... 220/695 |
| 5,505,330 | A | * | 4/1996 | Nunes ......................... 220/769 |
| 5,752,618 | A | * | 5/1998 | Trebitz et al. ............... 220/769 |
| D409,448 | S |   | 5/1999 | Hudson, Jr. et al. ......... D7/543 |

OTHER PUBLICATIONS

Playskool Easy Feeding Microwave Warm 'n Serve Dish Hasbro, Inc. Pawtucket, RI 02852 1990, 1996.
Tommee Tippee 1998.
Playskool Hasbro, Inc. Pawtucket, RI 02852 1996.

* cited by examiner

Primary Examiner—Joseph M. Moy
(74) Attorney, Agent, or Firm—Taylor J. Ross

(57) ABSTRACT

A handle accessory includes an elongate rim mount having by parallel, spaced inner and outer flanges forming a downwardly directed receiving groove which is adapted to engage over and receive a bowl rim. A thumb rest extends outward from the outer flange along the lower edge portion thereof and centrally thereof. This rest has an upwardly curving outer end portion which tends to assist in retaining the thumb on the rest and preventing any accidental slipping therefrom. An upper flange, which is preferably coextensive with the length of the rim mount, tapers upwardly and inwardly relative thereto, providing a scraping edge against which the filled spoon can be easily slid to level the food, preferably no higher than the upper rim of the spoon. It will also be recognized that this upper flange an effective splatter shield for the outwardly positioned thumb. As a variation, the handle accessory can also incorporate an elongate support projection integral with the outer flange and extending from the lower edge thereof in alignment with the thumb rest. This support projection arcs downwardly and inwardly beyond the inner flange so as to underlie the side and bottom of the bowl for a substantial transverse portion thereof. In this manner, the support projection itself provides for a direct support of the bowl with or without an actual positioning of the hand beneath the bowl.

12 Claims, 3 Drawing Sheets

HANDLE ACCESSORY FOR INFANT FEEDING BOWL

CROSS-REFERENCE TO RELATED APPLICATIONS

This application is related to Ser. No. 29/097,608, which is incorporated by reference herein and made a part hereof, including but not limited to those portions which specifically appear hereinafter.

BACKGROUND OF THE INVENTION

The present invention relates in general to feeding articles for infants. In particular, the present invention relates to a handle which attaches to an infant's feeding bowl.

In the feeding of infants, the food, normally a puree, is typically held within a bowl or deep plate. In attempting to avoid the child "playing" with the food, parents will typically hold the bowl in one hand, well away from the infant, while feeding the infant with the other. This is normally achieved by supporting the bowl bottom with the fingers while engaging the thumb with and over the bowl rim, the thumb occasionally slipping into the food. On occasion, there is also a problem with stability arising from the single point of contact between the thumb and the bowl rim.

Another problem frequently encountered in infant feeding is the tendency to load the spoon with too much food. While the infant spoon is generally sized for acceptance within the infant's mouth, if the spoon is overloaded or overflowing with the food, the food normally ends up smeared upon the infant's face and quickly spread about the infant by the infant's hands and normal curiosity as to what is on his/her face. Thus, the parent must be well practiced in carefully loading the spoon for a clean introduction of at least a major portion of the food into the infant's mouth.

SUMMARY OF THE INVENTION

The present invention involves a multi-purpose accessory which, in a simple and efficient manner, releasably mounts to a feeding bowl and, when mounted, provides an elongate gripping area along a significant portion of the rim, a convenient thumb rest outwardly spaced from the bowl and shielded therefrom, and an upper flange conveniently positioned to act as a splatter shield. This upper flange may be inclined inward to form a scraping edge to allow for a leveling of the spoon contents prior to an attempted insertion into the infant's mouth.

The handle accessory is preferably a unitary item of an appropriate food-compatible synthetic resinous material which snaps onto the bowl rim to provide an interlocking engagement therewith sufficient to provide for a stable thumb rest and food-leveling edge, while at the same time allowing the accessory to be readily released from the bowl for cleaning purposes.

Basically, the accessory comprises an elongate rim mount defined by parallel spaced flanges forming a downwardly directed receiving groove which is adapted to engage over and receive the bowl rim. The actual engagement with the bowl rim can be enhanced by internal undercuts in either or both flanges as deemed best as to accommodate the actual configuration of the bowl rim, that is slightly beaded, enlarged, or the like.

The outer flange preferably extends slightly below the inner flange. Both flanges, for convenience of mounting, may have slightly outwardly flared lower and inner faces.

The thumb rest is integrally formed with the outer flange along the lower edge portion thereof and centrally thereof. This rust projects laterally outward from the outer flange and has an upwardly curving outer end portion which tends to assist in retaining the thumb on the rest and preventing any accidental slipping therefrom. While the thumb engages the rest at basically one point along the length of the rim, it will be appreciated that the retaining force thereof is transferred along a substantial portion of the length of the rim by the rim mount. This tends to substantially enhance the stability of the gripping of the bowl.

The upper flange, which is preferably coextensive with the length of the rim mount, tapers upwardly and inwardly relative thereto, providing a scraping edge against which the filled spoon can be easily slid to level the food, preferably no higher than the upper rim of the spoon. It will also be recognized that this upper flange an effective splatter shield for the outwardly positioned thumb.

As a variation, the handle accessory can also incorporate an elongate support projection integral with the outer flange and extending from the lower edge thereof in alignment with the thumb rest. This support projection arcs downwardly and inwardly beyond the inner flange so as to underlie the side and bottom of the bowl for a substantial transverse portion thereof. In this manner, the support projection itself provides for a direct support of the bowl with or without an actual positioning of the hand beneath the bowl. Such a support projection can also allow for a direct holding of the bowl solely by the thumb rest. However, this would not be a preferred manner of handling the bowl or using the handle accessory. The mounting of the accessory with support projection can easily be effected by swinging the support projection downwardly about the bowl and engaging the rim mount groove with the bowl rim in basically a single movement. Removal will be equally simple.

The accessory itself, while substantially rigid, will include a sufficient resilient flexibility, as to allow for a ready mounting and removal of the accessory, a slight flexing of the rim mount to accommodate bowls of slightly varying arcs, and an effective and releasable snap locking of the rim mount to the bowl.

Other features and advantages of the invention will become more apparent from the further details of the invention to be more specifically set forth.

BRIEF DESCRIPTION OF THE DRAWINGS

The objects and features of the invention noted above are explained in more detail with reference to the drawings, in which like reference numerals denote like elements, and in which.

DETAILED DESCRIPTION OF THE INVENTION

Figure 1:
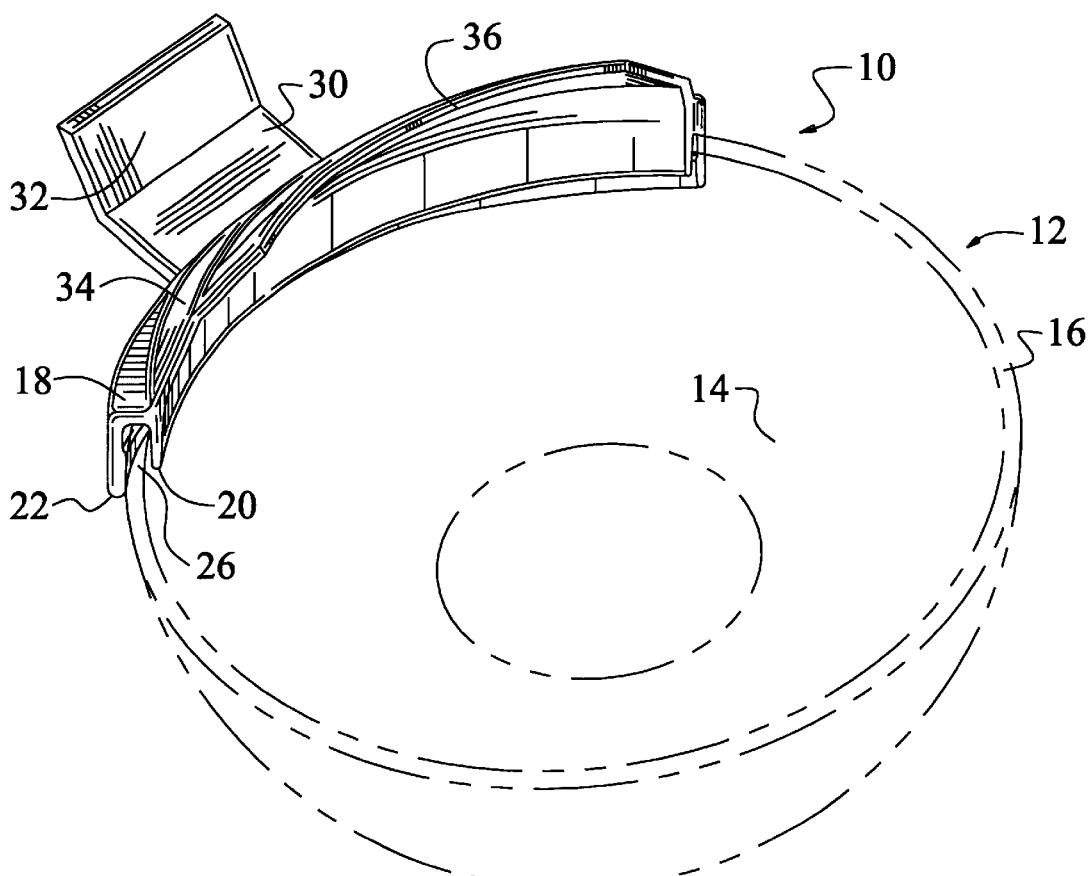
FIG. 1 is a perspective view of the handle accessory in mounted position on a bowl shown in phantom lines.
Figure 2:
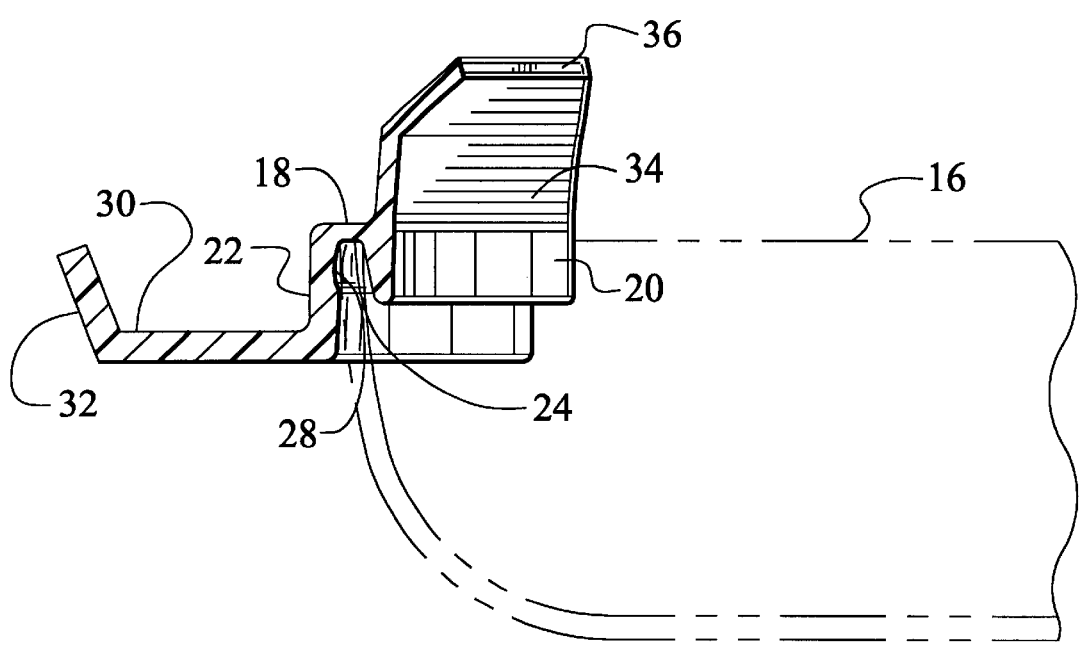
FIG. 2 is an enlarged cross-sectional view taken substantially on a plane passing along line 2—2 in FIG. 1.
Figure 3:
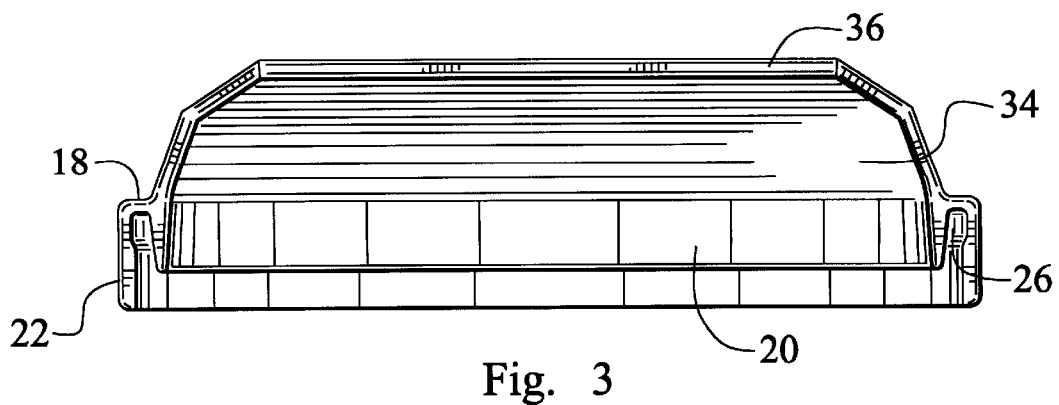
FIG. 3 is a front or bowl-side view thereof.
Figure 4:
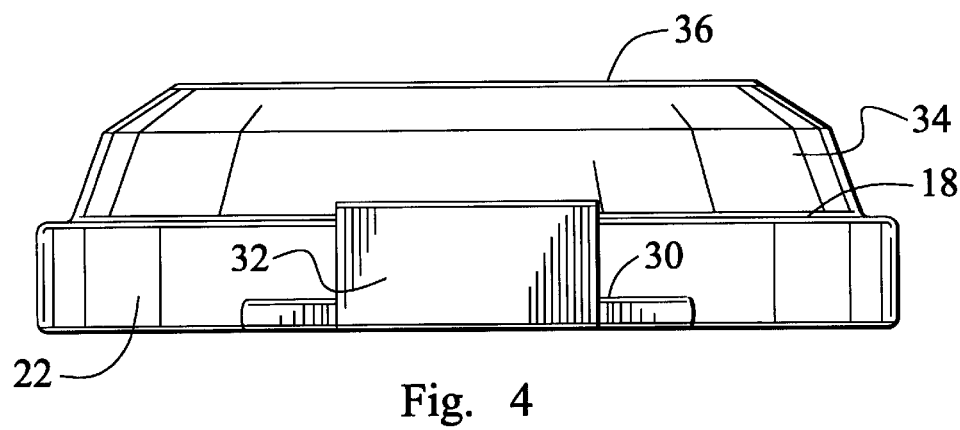
FIG. 4 is a rear elevation view thereof.
Figure 5:
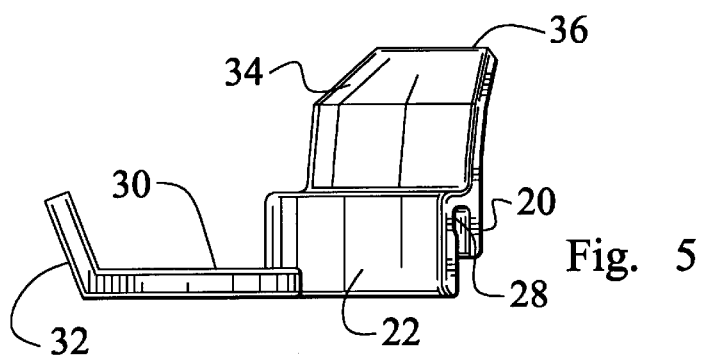
FIG. 5 is a side elevation view thereof.

Referring now more specifically to the drawings, a handle accessory according to the present invention is generally designated by reference numeral 10. The handle accessory 10 may be formed of a variety of materials, using a variety of methods. It is preferred, however, that it be formed as a monolithic member of appropriate substantially rigid and food-compatible synthetic resinous material formed by injection molding. The handle accessory 10 is intended for use with an infant feeding bowl generally identified by reference numeral 12. Such an infant feeding bowl 12 will include a central depression 14 to receive the food, and a rim 16 surrounding the central depression 14 and extending upward therefrom, as is well known.

The handle accessory 10 includes a rim mount 18 in the form of an elongated member having a shape which will conform to the rim 16 of infant feeding bowl 12. For a infant feeding bowl 12 having a circular rim 16, as shown, this will result in the rim mount 18 having the form of a section of an arc conforming to the diameter of rim mount 18.

The rim mount 18 an inner and an outer flange 20 and 22 extending from a lower edge 24 of rim mount 18. The flanges 20 and 22 are in parallel relation, and spaced outward from each other, such as radially outward for the arcuate rim mount 18 shown. The flanges 20 and 22 define a receiving groove 26 therebetween.

While not required, in the preferred form shown the outer flange 22 is of greater height than the inner flange 20 and thus extends below the inner flange 20 a predetermined distance. The reason for this preferred arrangement will be made clear below. The opposed inner faces of both flanges 20 and 22, adjacent the free ends thereof may be slightly outwardly beveled to facilitate introduction of the rim 16. The spacing between the inner flange 20 and outer flange 22 is set such that the rim 16 will be firmly received within the receiving groove 26. As such, the handle accessory 10 will have a limited range of thickness of rim 16 with which it will operate, depending upon the width of the receiving groove 26 chosen. In practice, the lower limit of thickness for rim 16 may be more readily determined, since the upper limit on the thickness of rim 16 may be extended due to the inherent flexibility of most plastics. In this regard, it is noted that this flexibility will also permit the handle accessory 10 to be used with infant feeding bowls 12 having a shape which varies to some degree from that of the handle accessory 10, such as by a slightly different diameter for the circular embodiment shown.

It is desired that the handle accessory 10 have a relatively firm frictional engagement with the rim 16 to secure the handle accessory 10 thereto. To assist in this, the inner faces of the inner flange 20 and outer flange 21 may conform to the particular cross-sectional shape of the rim 16. In the example shown, the rim 16 includes an outwardly directed ridge upon its outer face. The inner face of the outer flange 22 thus includes a mating slot 28 therein positioned and sized to mate with the ridge upon rim 16 when the handle accessory 10 is mounted to infant feeding bowl 12. As may be envisioned, such a mating relationship greatly reduces the possibility that the handle accessory 10 will be inadvertently removed from the rim 16.

The length of the rim mount 18 will also have an effect upon the security of the attachment. In the embodiment shown, the arcuate rim mount 18 extends for greater than 90 degrees, but less than 180 degrees. The particular length chosen will vary based upon the fit of the receiving groove 26, and other factors readily perceived by those in the art.

The handle accessory 10 also includes a thumb rest 30 extending outward from the rim mount 18. In the embodiment shown, the thumb rest 30 extends from the free edge of the outer flange 22, and is formed as a monolithic extension thereof. Alternatively, the thumb rest 30 may be mounted at a position spaced from the free edge, and/or may be formed as a separate element secured thereto.

Depending upon the length chosen for the rim mount 18, the thumb rest 30 may have a dimension along the length of the rim mount 18 which is substantially less than that of the rim mount itself, as shown. Further, the thumb rest 30 may, and preferably does, include an upwardly flared portion 32 at its outward end which serves to act as an abutment for the user's thumb against movement away from the infant feeding bowl 12.

In use, the user will mount the handle accessory 10 to the infant feeding bowl 12 by first aligning the receiving groove 26 with the rim 16, and then manually pressing downward to cause the rim 16 to be received within the receiving groove 26. The user may then place the thumb of one hand upon the upper surface of the thumb rest 30, and the fingers of that same hand positioned below the central depression 14 of the infant feeding bowl 12. As such, the user may support the infant feeding bowl 12 with a single hand. The pressure of the thumb upon the thumb rest 30 serves to stabilize the infant feeding bowl 12 against tipping. This pressure is transmitted through the thumb rest 30 to the outer flange 22. As may be envisioned, the lower portion of the outer flange 22 presses upon the outer face of the infant feeding bowl 12, while the upper portion of the inner flange 20 presses against the inner face of the infant feeding bowl 12. It is for this reason that the outer flange 22 may be formed with a greater height that the inner flange 20, if desired.

Figure 6:
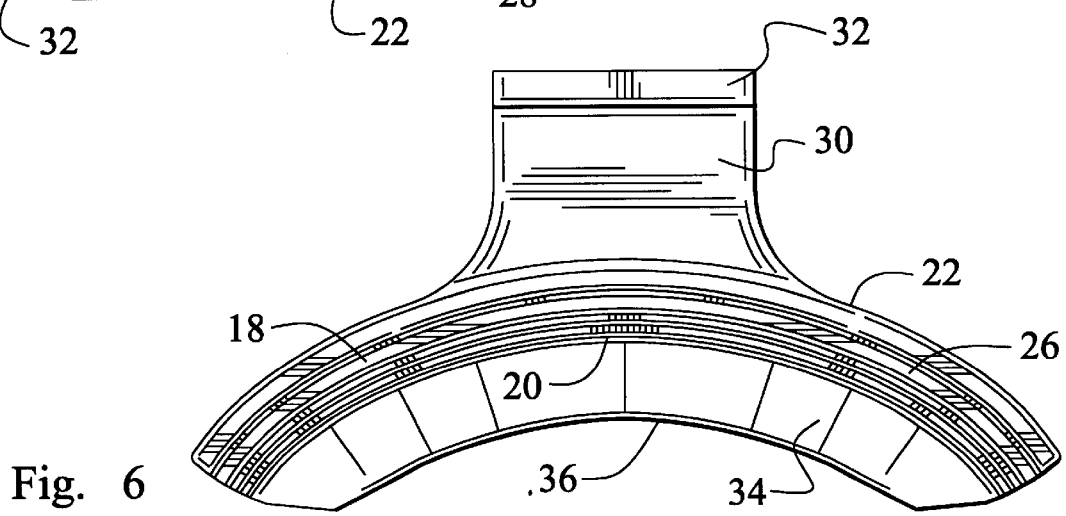
FIG. 6 is a top view thereof.

The above arrangement provide several benefits. For example, the fingers may be positioned adjacent the edge of the central depression 14 (or upon the side of the infant feeding bowl 12), and the pressure of the thumb upon the thumb rest 30 will prevent the infant feeding bowl 12 from tipping. As such, the user may place their hand in a comfortable position for holding the infant feeding bowl 12, even if the hand is relatively small in comparison to the infant feeding bowl 12. Further, the handle accessory 10 serves to supply the downward pressure of the thumb to the infant feeding bowl 12 without the user's thumb actually contacting the infant feeding bowl 12. This prevents the possibility of the user's thumb accidentally slipping into the interior of the bowl, as often occurs without use of the handle accessory 10. This serves to reduce mess, and contamination of the food within the infant feeding bowl 12. To increase the utility, it is preferred that the thumb rest 30 be relatively narrow with respect to the rim mount 18, and centrally positioned thereon, as best shown in FIG. 6. This permits the handle accessory 10 to be readily employed by both right-handed and left-handed users.

While the above arrangement provides utility, a further modification may be added to perform additional functions. Specifically, the handle accessory 10 may include an upper flange 34 which serves as both a scraper for adjusting the amount of food placed on the feeding spoon, and as a shield the hand, and particularly the thumb, from any tendency for the food to, at the whim of the infant in particular, be thrown from the bowl.

Accordingly, the upper flange 34 extends upward from the rim mount 18, preferably from the full, or substantially full, length thereof. The upper flange 34 has a height which will permit it to act as a shield against unintentionally exiting the infant feeding bowl 12, and terminates at a scraping edge 36 at its upper end. While the upper flange 34 could be formed as substantially vertical to act as a shield, it is, preferred that it be, or include a portion which is, angled inward toward the central depression 14 of infant feeding bowl 12. This will serve to space the scraping edge 36 inward with respect to the remainder of the upper flange 34. As such, the user may position the feeding spoon (not shown) beneath, and outwardly of, the scraping edge 36 and then move the spoon inward while maintaining a desired distance from the scraping edge 36. In many cases, this distance will be zero, with the user moving the upper edge of the spoon's bowl along the scraping edge 36. As may be envisioned, this will cause the scraping edge 36 to remove excess food from the spoon. As is well known, this will permit the combined food and spoon to more readily fit within the infant's mouth, reducing mess and wasted food. The accessibility of such a means directly at the edge of the bowl and in the area of engagement of the supporting hand with the bowl, provides for a convenient performance of this task which must be repeatedly performed with each spoonful.

Figure 7:
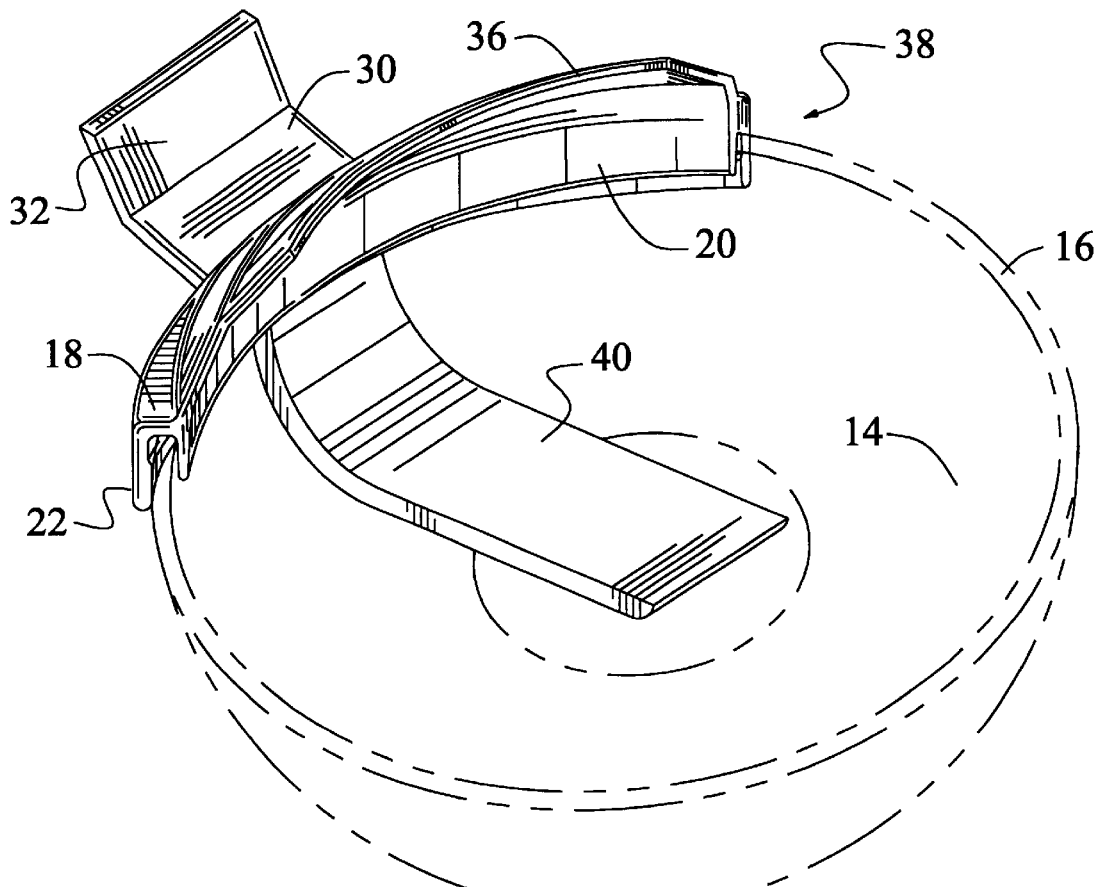
FIG. 7 is a perspective view of a second embodiment of the handle assembly.
Figure 8:
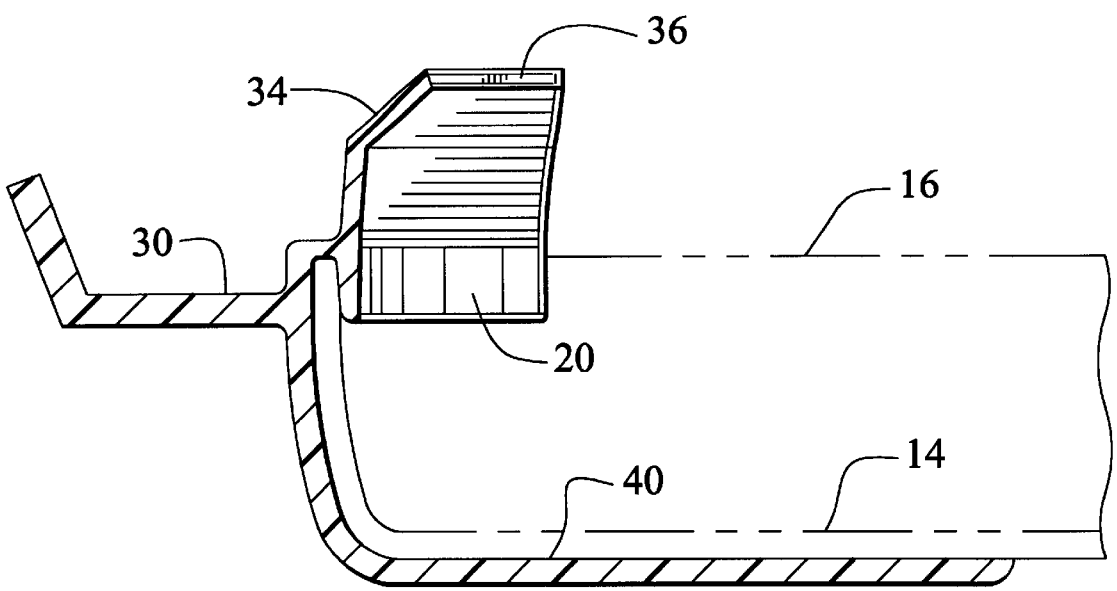
FIG. 8 is an enlarged cross-sectional view taken substantially on a plane passing along line 8—8 in FIG. 7.

With reference to FIGS. 7 and 8, a second embodiment of a handle accessory according to the present invention is generally designated by reference numeral 38. As with the first embodiment, the handle accessory 38 includes the rim mount 18, inner flange 20, outer flange 22, receiving groove 26 and thumb rest 30. In this arrangement, however, the infant feeding bowl 12 does not include an outward ridge adjacent its rim 16, nor does the receiving groove 26 include the mating slot 28 to receive this ridge.

To ensure that the handle accessory 38 is securely retained to the infant feeding bowl 12, the handle accessory 38 may include a support projection 40 extending from the outer flange 22. This support projection 40 will include a curvature such that it will contact the outer face of the central depression 14 of infant feeding bowl 12, at least adjacent the free end of the support projection 40. It is of course most preferred to have the support projection 40 closely conform to the curvature of the infant feeding bowl 12, as shown.

The support projection 40 will contact the infant feeding bowl 12 and thus serve to assist in supporting the infant feeding bowl 12 against tipping. This may be most desirable when, as shown, the bowl and handle accessory 38 do not have mating elements to secure the receiving groove 26 to the rim 16. It is not limited to these instances, however. For example, the support projection 40 may act as an extension of the user's fingers, and thus provide greater stability for users with small hands. Additionally, the support projection 40 may act as an insulator, spacing the user's hand from the bowl which may be uncomfortably warm. As such, the support projection 40 may also serve multiple purposes. It is further noted that the handle accessory 38 may further include the upper flange 34 if desired to increase its utility as noted above.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A handle accessory for infant feeding bowls which have a central depression surrounded by a rim, comprising:

a rim mount formed as an arc and having a shape substantially corresponding to at least a portion of a shape of the rim of the bowl, and having a length less than that of the rim of the bowl, said rim mount including a lower edge;

inner and outer flanges extending downward from said lower edge of said rim mount, said inner and outer flanges being in spaced parallel relation to define therebetween a receiving groove, said receiving groove having a width predetermined to provide a friction fit upon the bowl in proximity to the rim of the bowl when the rim of the bowl is received within said receiving groove;

a thumb rest extending outward from an outer face of said outer flange: and an upper flange extending upward from said rim mount.

2. A handle accessory as in claim 1, wherein said thumb rest further includes an upwardly flared portion adjacent a free end of said thumb rest, said upwardly flared portion providing an abutment of a user's thumb.

3. A handle accessory as in claim 1, wherein said receiving groove further includes a mating slot formed within one of said inner and outer flanges and constructed and arranged to receive a ridge extending outward from the rim of the bowl.

4. A handle accessory as in claim 1, wherein said upper flange includes a portion which extends inward with respect to said rim mount, to define a scraping edge on a free edge of said upper flange.

5. A handle accessory as in claim 4, wherein said rim mount is formed as an arc.

6. A handle accessory as in claim 4, wherein said thumb rest further includes an upwardly flared portion adjacent a free end of said thumb rest, said upwardly flared portion providing an abutment of a user's thumb.

7. A handle accessory as in claim 4, wherein said receiving groove further includes a mating slot formed within one of said inner and outer flanges and constructed and arranged to receive a ridge extending outward from the rim of the bowl.

8. A handle accessory as in claim 1, wherein said upper flange includes a portion which extends inward with respect to said rim mount, to define a scraping edge on a free upper edge of said upper flange.

9. A handle accessory as in claim 8, wherein said rim mount is formed as an arc.

10. A handle accessory as in claim 8, wherein said thumb rest further includes an upwardly flared portion adjacent a free end of said thumb rest, said upwardly flared portion providing an abutment of a user's thumb.

11. A handle accessory as in claim 8, wherein said receiving groove further includes a mating slot formed within one of said inner and outer flanges and constructed and arranged to receive a ridge extending outward from the rim of the bowl.

12. A handle accessory as in claim 8, wherein said thumb rest has a length, along a direction of said bowl rim, substantially less than that of said rim mount.

* * * * *